Sept. 26, 1967 R. T. REGAN ET AL 3,343,923
MULTITUBULAR STEAM-HYDROCARBON REFORMER FURNACE
Filed Oct. 21, 1965 3 Sheets-Sheet 1
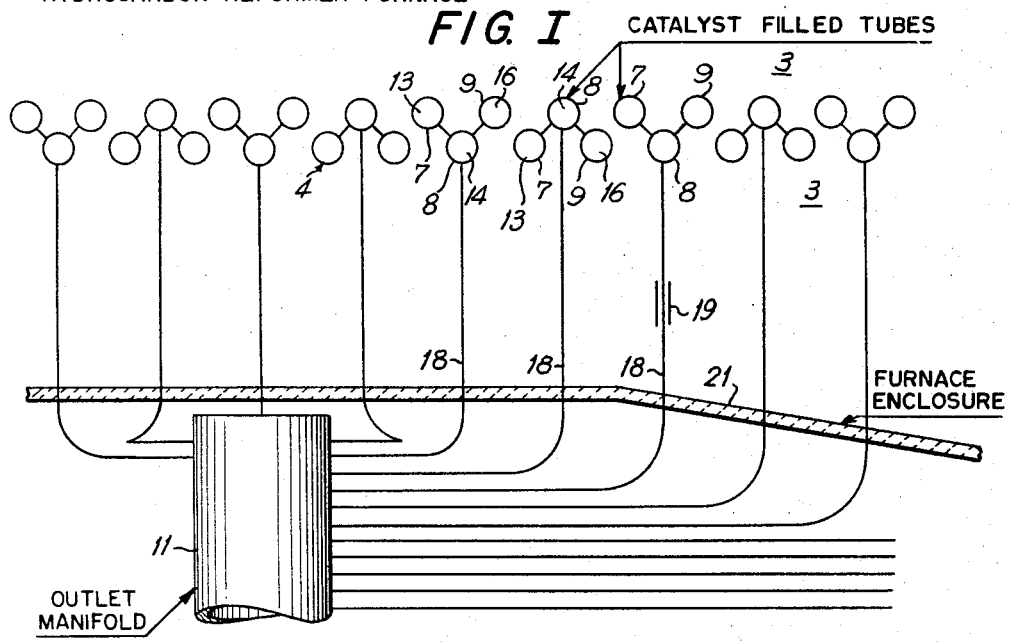
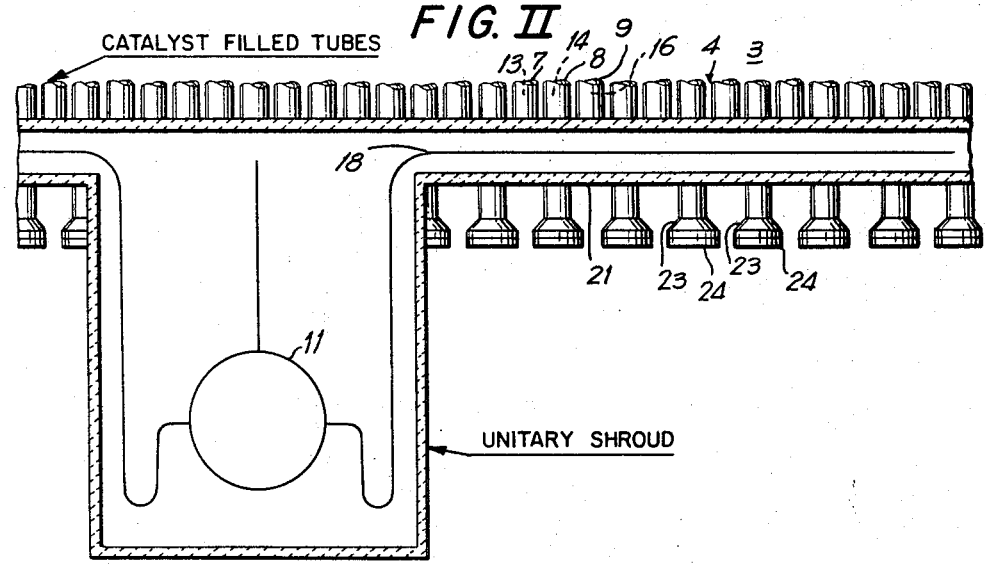
INVENTORS
ROBERT T. REGAN
PETER VonWIESENTHAL
BY
ATTORNEY FIG. III
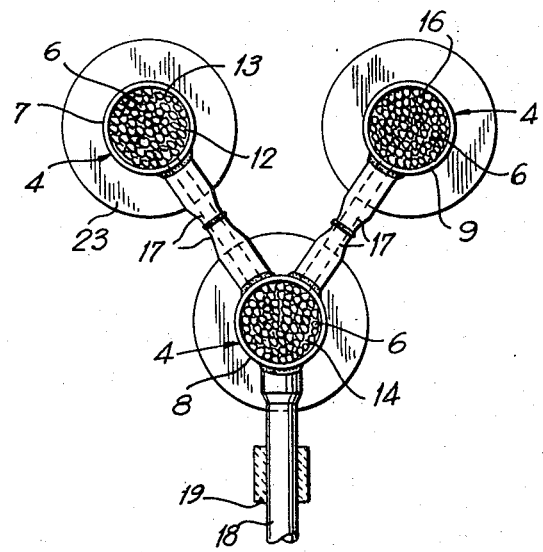
FIG. IV
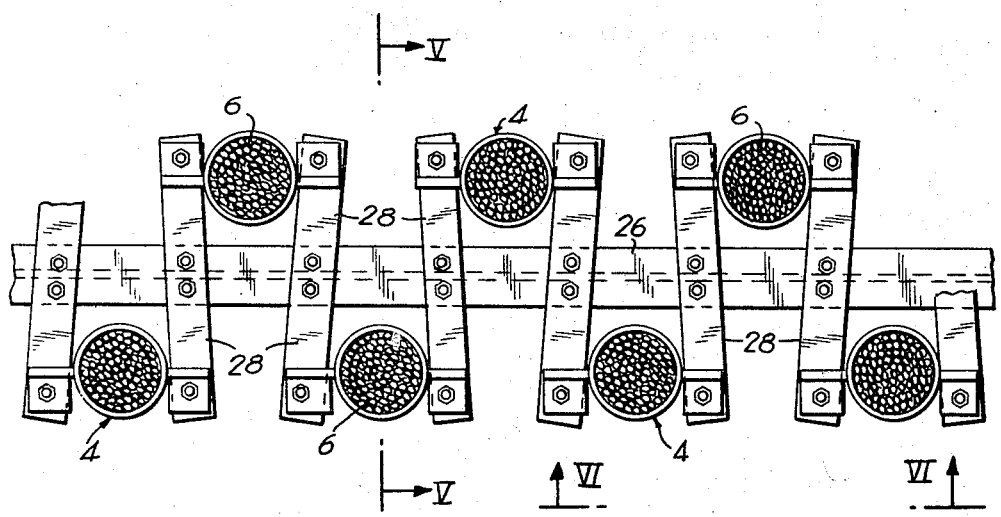
INVENTORS
ROBERT T. REGAN
PETER VonWIESENTHAL
BY
ATTORNEY

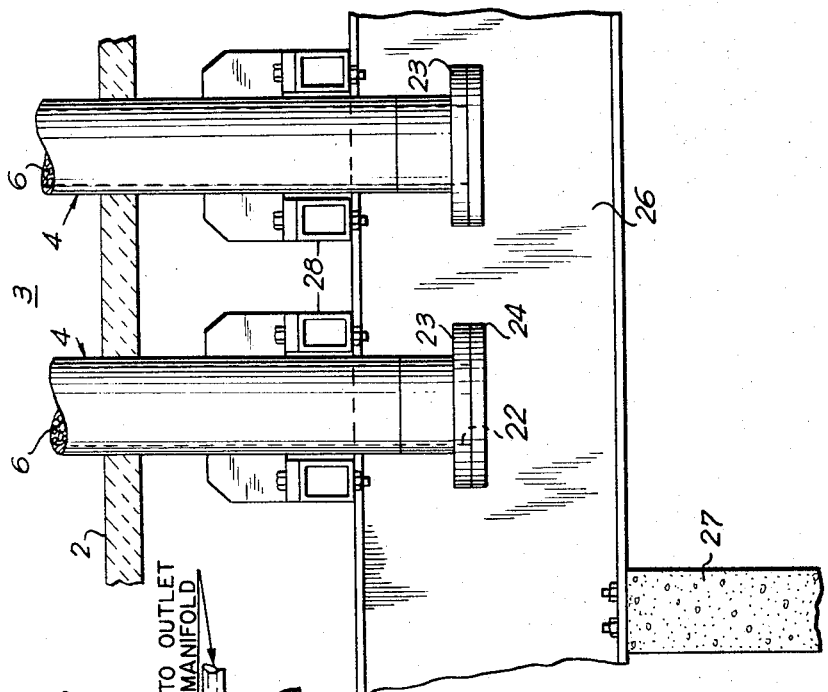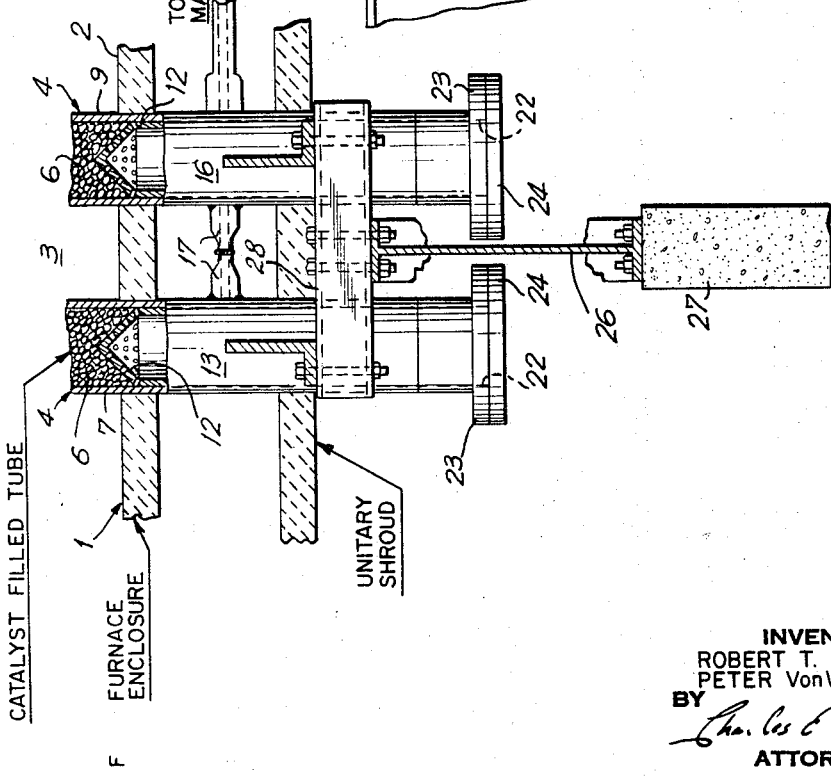

United States Patent Office 3,343,923
Patented Sept. 26, 1967

3,343,923
MULTITUBULAR STEAM-HYDROCARBON REFORMER FURNACE
Robert T. Regan, 34 Park Terrace, Caldwell, N.J. 07006, and Peter von Wiesenthal, 17 E. 89th St., New York, N.Y. 10028
Filed Oct. 21, 1965, Ser. No. 499,351
1 Claim. (Cl. 23—288)

ABSTRACT OF THE DISCLOSURE

In hydrocarbon reformer furnaces this invention teaches the combining of flows from a plurality of furnace tubes into a single outlet pigtail to relieve congestion at the outlets of these furnaces. Pigtails are housed in a unitary shroud to reduce insulation costs. Staggered double rows of furnace tubes are supported from either side of a beam.

---

This disclosure contemplates introducing fluids to or removal of fluids from furnace tubes which are disposed in parallel flow relationship with each other and are spaced close together in a bank. The invention resides in a novel arrangement of pigtail pipes which relieves crowding at the terminals of a furnace tube bank.

Plant economics and uniformity of heat flux about the peripheries of furnace tubes are usually compromised vis-a-vis to give a spacing of approximately two nominal diameters for furnace tubes. Where the tubes are aligned with the flow of hot combustion gases they are often staggered in double-rowed banks for compactness. While such staggered, double-rowed banks are well suited for advantageous heat-transfer versus initial-cost relations, they frequently pose layout problems which will be outlined more fully.

To allow for catalyst insertion, regeneration and/or removal, tubes are generally flanged and blanked at their ends. To permit thermal growth, flexible pipes (known as pigtails) are used for introducing fluids into the tubes and for emitting fluids therefrom.

It should be understood that flow through a granular-catalyst-filled tube is through interstices of that material, so this flow is far less than flow through a full-flowing tube of the same size. Since there is no granular catalyst in the pigtails; however, the area required for flow of the fluid therethrough is considerably less than that of the catalyst-filled tube. It should also be clear that the pigtails must usually be insulated for personnel protection and/or heat conservation. Accordingly, to accommodate large numbers of pigtails with thick insulation (such as for example at the outlets of steam-hydrocarbon reforming furnaces) has presented major layout problems. It is to these layout problems that this advance is directed.

With a furnace having at least two tubes arranged in parallel flow relationship and each having an end in like flow orientation and in the vicinity of each other and with the furnace including a terminal manifold, the present advance teaches connecting one of the tube ends in flow series with the other like-oriented tube end and communicating one of the tube ends in flow series with the manifold for flow communication therewith.

Basically this teaching simplifies pigtail layouts. The number of pigtails required are reduced. Insulation thickness can also be increased for personnel safety. These and other advantages will appear more fully from the accompanying drawings wherein the invention is applied specifically to the collection of products from furnace tubes of a steam-hydrocarbon reformer furnace and wherein:

FIGURE I is a schematic view in plan of a bank of reformer tubes with associated outlet pigtails and a collecting manifold according to this invention.

FIGURE II is a side view of the tubes, pigtails and manifold shown in FIGURE I.

FIGURE III is a detailed plan view of a cluster of three tubes with interconnecting conduits and a pigtail pipe.

FIGURE IV is a detailed plan view illustrating the support arrangement for the tubes.

FIGURE V is an elevation view taken along line V—V of FIGURE IV.

FIGURE VI is an elevation view taken along line VI—VI of FIGURE IV.

In the drawings a furnace includes setting 1 which has floor 2 and defines enclosure 3. As is well known in furnace design, means (not shown) are provided for flowing hot combustion gases upward through enclosure 3.

A parallel flow relationship is indicated by arrows through furnace tubes 4. For advantageous heat-transfer vs. initial-cost relations, tubes 4 are assembled vertically in a staggered double row. In the shown embodiment the tubes are filled wth granular catalyst 6, but it should be understood that applications exist wherein catalysts need not necessarily be employed. First, second and third tubes (7, 8 and 9) penetrate floor 2 so that first, second and third tube ends project outside enclosure 3.

For collection of gases from the tubes the furnace includes outlet manifold 11 also situated outside enclosure 3. Catalyst supports 12 in each of the furance tubes 4 are spaced from the tube ends to define first 13 second 14 and third 16 outlet chambers in the first second and third tube ends respectively. Conduit means shown as nipple pairs 17 communicate first 13 and third 16 outlet chambers in flow series with second outlet chamber 14 to deliver product fluids thereto. For conducting product fluids from second outlet chamber 14 to outlet manifold 11, pigtail pipes 22 are connected in flow series therebetween.

Provision must be made for thermal growth of furnace tubes 4. Toward this objective pigtail pipes 18 are designed to have substantially less rigidity than second tubes 8 so that pigtail pipes 18 may yield to accommodate elongation of the tubes. For employee safety, pigtail pipes are usually jacketed with insulation 19 or are enclosed in a unitary shroud 21.

It is desirable to allow for catalyst loading, reactivation and/or removal. Accordingly the tube ends define catalyst openings 22. Catalyst supports 12 are sized to be removable via catalyst openings 22. Flanges 23 surround catalyst openings 22 and are adapted to receive blanking gaskets 24 in sealing relationship therewith.

As best seen in FIGURES IV, V and VI; beam 26 is supported from piers 27 and carries depending members 28 which are in turn connected to furnace tubes 4 for maintaining the tubes in furnace enclosure 3.

Clusters of three (or more) tubes with a common pigtail may be preassembled in a shop for ease of fabrication and convenience of shipment.

It will be understood by those skilled in fired heater design that wide deviations may be made in the shown embodiment without departing from the main theme of invention set forth in the claim.

What is claimed is:

A multitubular steam-hydrocarbon reformer furnace including a setting which has a bottom and defines an enclosure,
  means for flowing hot combustion gases upward through the enclosure,
  a plurality of catalyst-filled furnace tubes arranged vertically in staggered double rows to pass through the enclosure,
  means for coursing steam and hydrocarbon downward through the tubes in parallel flow relationship one with the other for non-contact counterflow heating by the upflowing combustion gases, the tubes including a first, second and third tube each substantially the same size and material and each having an outlet end which penetrates the bottom so that it projects below the enclosure, a catalyst support in each of the tubes and spaced from the end of that tube to define first, second and third outlet chambers in the tubes, conduit means communicating the first and third outlet chambers in flow series with the second outlet chamber to deliver fluids thereto, a pigtail pipe connected in flow series between the second tube and the outlet manifold for collection of the fluids therein, the pigtail pipe designed to have substantially less rigidity than the second tube so that the pigtail pipe may yield to accommodate elongation of the tubes, a unitary shroud enclosing the pigtail pipe and the outlet manifold, each of the tube ends defining a catalyst opening for access into that tube, the catalyst supports arranged to be removable via its associated catalyst opening, each of the catalyst openings having a removable gasket connected thereto for sealing, a beam positioned between the ends of the staggered double row of tubes and below the floor, at least one member depending from the beam and connected to the wall of each of the tubes for supporting that tube in the enclosure.

References Cited

UNITED STATES PATENTS

| | | | |
|---|---|---|---|
| 2,211,903 | 8/1940 | McCarthy | 122—356 |
| 2,603,559 | 7/1952 | Patterson | 23—277 X |
| 3,119,671 | 1/1964 | Koniewiez et al. | 23—277 |
| 3,129,065 | 4/1964 | Koniewiez | 23—277 |
| 3,146,075 | 8/1964 | Robb et al. | 23—288.92 |
| 3,172,739 | 3/1965 | Koniewiez | 23—277 X |
| 3,257,172 | 6/1966 | Kao et al. | 23—277 |

FOREIGN PATENTS 164,472   8/1955   Australia.

NORMAN YUDKOFF, *Primary Examiner.*

WILBUR L. BASCOMB, Jr., *Examiner.*

F. E. DRUMMOND, *Assistant Examiner.*